F. E. NIBLO.
APPARATUS FOR THE REMOVAL OF HAY RACKS.
APPLICATION FILED MAR. 29, 1917.

1,244,235.

Patented Oct. 23, 1917.
2 SHEETS—SHEET 2.

Inventor
F. E. Niblo

UNITED STATES PATENT OFFICE.

FLOYD EDWARD NIBLO, OF FREEPORT, ILLINOIS.

APPARATUS FOR THE REMOVAL OF HAY-RACKS.

1,244,235.

Specification of Letters Patent.

Patented Oct. 23, 1917.

Application filed March 29, 1917. Serial No. 158,368.

*To all whom it may concern:*

Be it known that I, FLOYD EDWARD NIBLO, a citizen of the United States, residing at Freeport, in the county of Stephenson, State of Illinois, have invented a new and useful Apparatus for the Removal of Hay-Racks; and I do hereby declare the following to be a full, clear, and exact description of the invention, such as will enable others skilled in the art to which it appertains to make and use the same.

The invention relates to an apparatus designed for the removal of hay racks from their running gears or for their replacing on the running gear after having been once removed.

One of the objects is to provide in such an apparatus a quick and effective means for the removal of the hay rack.

A further object is to provide a lever operated apparatus by which a hay rack may be automatically raised from its running gear by driving it between the two levers comprising the apparatus.

A still further object is to provide a locking means for the levers when not in use.

A still further object is to provide an apparatus which can be easily and cheaply built and conveniently placed where it may always be ready for use.

Other objects of the invention will appear in the detailed description which follows.

The drawings illustrate and the specification describes a particular embodiment of the invention, but to this embodiment the invention is not to be restricted. Practice may suggest certain changes or alterations which the right is claimed to make, provided such changes or alterations do not depart from the spirit of the appended claim.

Should the drawings and specification fail to agree by having the one set forth some structure that is not fully treated by the other, such failure of agreement between the two is not to be construed as a relinquishment of right to such structure.

A uniform system of designating the different parts of the invention obtains in all the figures of the drawings, wherein:

Fig. 4 is a sectional view on the line 4—4 of Fig. 2.

Fig. 5 is a detailed perspective view of the lever lock.

Figure 1:
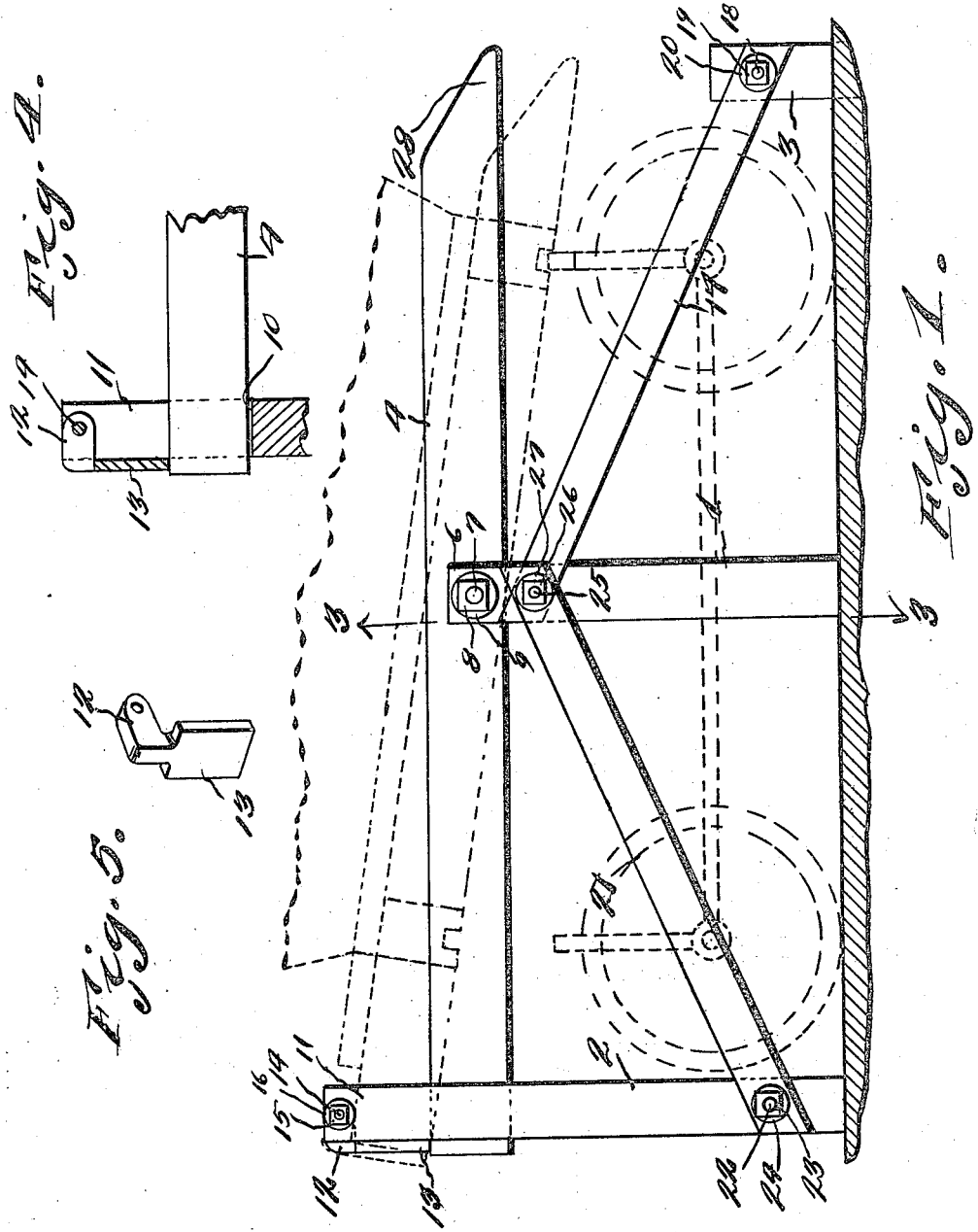
Figure 1 is a side elevation of the invention, a hay rack removed from its running gear being shown in dotted lines.
Figure 2:
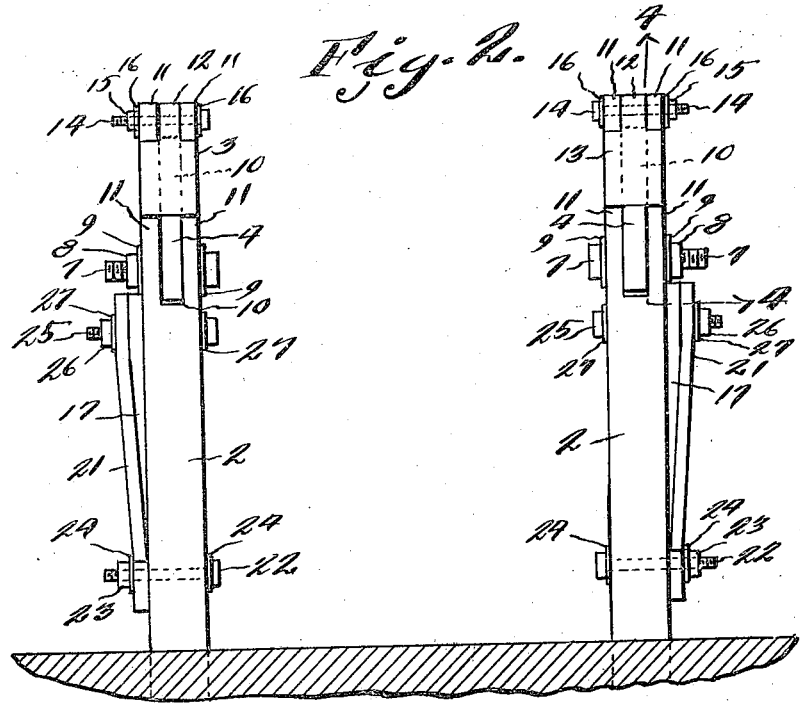
Fig. 2 is an end elevation.
Figure 3:
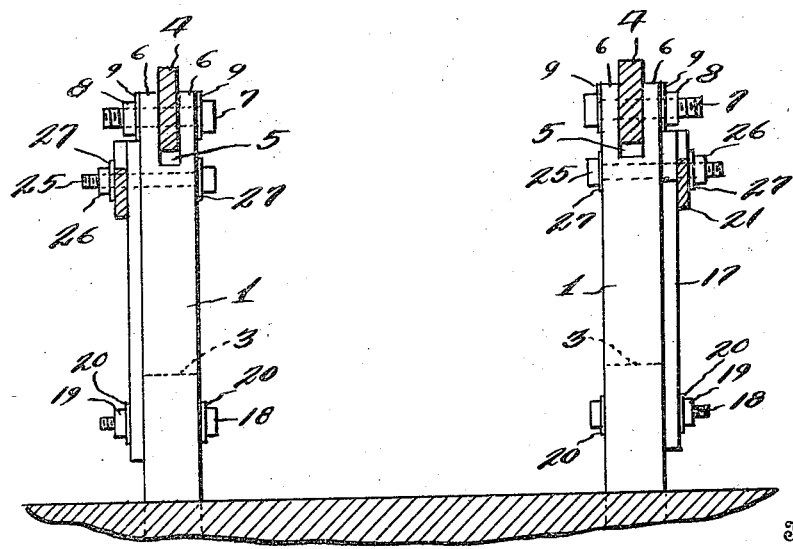
Fig. 3 is a sectional view on the line 3—3 of Fig. 1.

The particular embodiment of the invention which the drawings illustrate comprises the central posts 1, the forward posts 2, the rear posts 3 and the levers 4. The posts 1, 2 and 3 of one set are alined with each other and conveniently spaced from posts 1, 2 and 3 of the other set, the intervening space between the two sets of posts being sufficient to permit a hay rack with its attached running gear to be drawn in between them. All of the posts are intended to be fixed in the ground by any acceptable means. As both sets of posts and their attached lever are identical, the detailed description is confined to one set.

The post 1 is provided at its upper end with the slot 5, the legs 6 formed thereby straddling the lever 4. A suitable bolt 7 passes through the legs 6 and through the lever 4 holding the latter pivotally supported in the post 1. A nut 8 screws on to the bolt 7 and secures it in the legs 6, suitable washers 9 being under the head of the bolt 7 and the nut 8.

The forward post 2 has a slot 10 in alinement with the slot 5 of the post 1. The post 2 is higher than the post 1 but the slot 10 is cut deep enough to permit the lever 4 to assume a horizontal position, the forward end of the lever 4 being designed to oscillate in the slot 10. The legs 11, resulting from the forming of the slot 10, carry between them at their upper edge the arm 12 of the lock-plate 13, a bolt 14 passing through the legs and pivotally engaging the arm 12. The nut 15 and washers 16 are provided for bolt 14.

The lock-plate 13 has the same width as the post 2 but its arm 12 is slightly thinner than the slot 10, so that the plate may be easily moved on the bolt 14. The lever 4 extends beyond the post 2 a sufficient distance to permit the plate 13 to drop over its upper edge when the lever is at the bottom of the slot 10. The plate 13 is designed to lie normally against the edges of the legs 11 to keep the lever 4 at the bottom of the slot 10. The plate 13 may, however, be lifted away from the legs 11 to permit the lever 4 to be raised to the top of the slot 10, the under edge of the arm 12 limiting the height to which the lever 4 can be raised and thereby preventing its being disengaged from the slot 10. The rear post 3 is designed to be relatively short, projecting from the ground a sufficient distance only to permit the attachment of the brace 17 which is effected by means of the bolt 18 and its nut 19, washers 20 being used in conjunction with the bolt and nut.

The lever 4, at the end remote from the portion which engages the slot 10 is angled off as shown at 28 in Fig. 1. This end is angled to facilitate the engagement of the side sill of the hay rack.

The apparatus is utilized to remove hay racks from their running gears, the hay rack to be removed with its attached running gear being drawn in between the levers 4 after their angled ends 28 have been depressed, the lock plates 13 being pulled out to permit the depression of the ends 28. As the hay rack is being drawn between the two levers its side sills rest upon the upper edge thereof and, as the levers 4 are in an inclined position, the front end of the rack is lifted from its bolster as it moves in the direction of the length of the lever. When the rack has been drawn far enough between the levers 4 to bring the greater part of its weight between the posts 2 and 1, the levers 4 are brought back to their normal position, raising the rear end of the rack from its bolster and allowing the lock plates 13 to drop back in place, thus holding the hay rack raised from its running gear which can then be easily drawn away to be used for other purposes. The apparatus is designed to hold the hay rack until it is again desired to replace it, when the running gear is backed under it and the ends 28 of the levers depress (after the lock plates 13 have been withdrawn from their normal positions) until the rear end of the rack rests upon the rear bolster, after which the continued back of the running gear will operate to draw the hay rack down the inclined levers until the front end again rests upon the front bolster. The rack and its running gear may be then backed out from between the levers 4, after which it is again ready for use.

What is claimed is:

In a hay rack lifting device, a pair of side frames spaced apart sufficient to permit a vehicle running gear to pass therebetween, each side frame comprising end posts, a short one and a long one, each side frame having a central post of the height intermediate the heights of the short and long posts, braces connecting the end and central posts, the long end post of each side frame having its upper end bifurcated, a beam pivoted substantially midway its ends to each central post and having one end playing in said bifurcation, whereby said beam may be tilted downwardly at one end to permit one side of a wagon body to slide thereon, a pivot bolt mounted in the upper ends of the forks of the bifurcated end post, a gravity actuated angle plate latch mounted on said bolt and adapted to limit the upward tilting action of one end of said beam, said latch having a depending portion adapted, when one end of said beam tilts downwardly in contact with the crotch of the bifurcation, to gravitate in the path of said beam, whereby its upward movement is prevented.

In testimony whereof I have signed my name to this specification in the presence of two subscribing witnesses.

FLOYD EDWARD NIBLO.

Witnesses:
L. R. JUNGKUNZ,
JOHN S. COLLMAN.